United States Patent Office 3,273,061
Patented Sept. 13, 1966

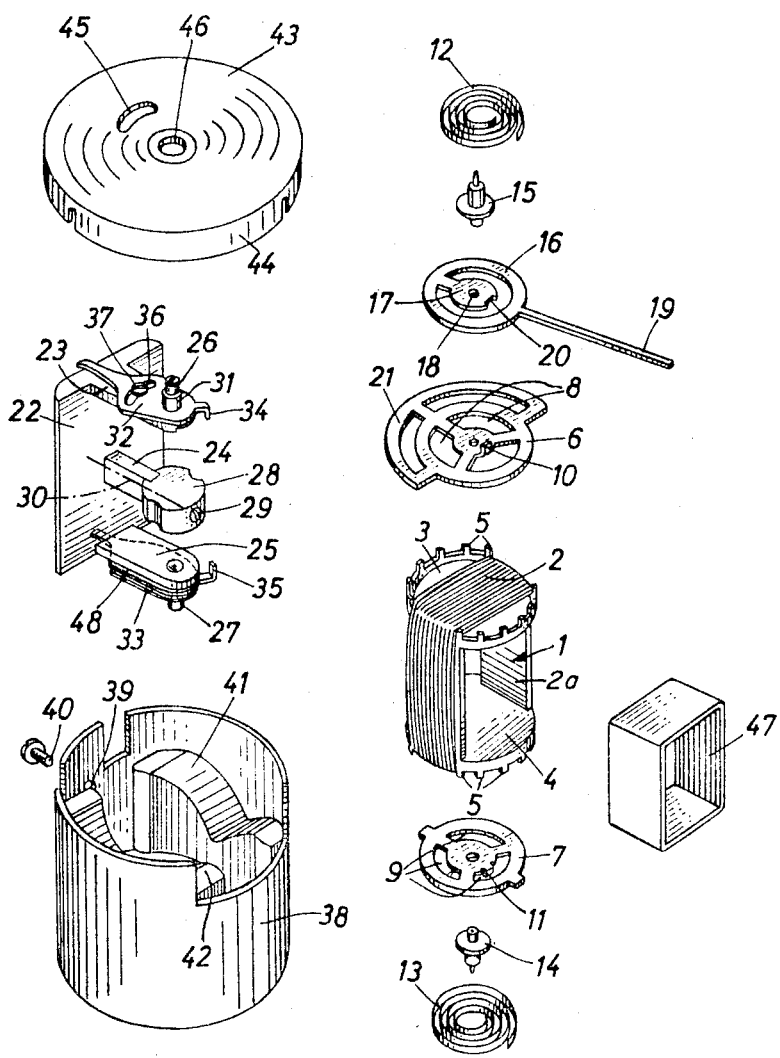

3,273,061
GALVANOMETER COIL ASSEMBLY HAVING A PLASTIC COIL FRAME
Fritz Rümpelein, Munich, and Paul Kopf, Unterhaching, near Munich, Germany, assignors to Agfa Aktiengesellschaft, Leverkusen-Bayerwerk, Germany, a corporation of Germany
Filed Feb. 23, 1962, Ser. No. 175,117
Claims priority, application Germany, Mar. 1, 1961, A 36,855
8 Claims. (Cl. 324—151)

This invention relates to a moving coil type of galvanometer which is especially adapted for use in photoelectric exposure meters, and it more particularly relates to a simple and economical form of such an instrument which is well adapted for mass production.

In accordance with this invention the galvanometer coil is wound upon a small molded plastic frame whose two ends are connected by longitudinal stringers. The coil frame is preferably made of a polycarbonate type plastic material, and bearing flanges are mounted upon each of its ends. This form of frame has the advantage of being easily manufactured in its finished dimensional form by an injection molding process; and since no finish machining is necessary, the danger of contaminating the frame with iron chips or filings which would irreparably damage it is avoided. Furthermore, the edges upon the frame are curved to avoid any danger of breaking the magnetic winding when it is applied upon it, and the use of plastic material also dispenses with the need for any insulation between it and the coil wound upon it.

The bearing flanges carrying pivot points are easily fastened to the ends of the frame by molded lugs which extend longitudinally from the ends of the frame and are bent and deformed over the bearing flanges to fasten them to the frame.

Manufacture is further simplified by incorporating upon a bearing flange, which carries the pointer element, a compensating mass displaced 180° from the direction of extension of the pointer. This compensating mass is advantageously constructed in the form of a semi-circular extension of the bearing flange, which minimizes its radial extension beyond the rest of the flange and facilitates its manufacture of the same material and thickness as the bearing flange. The compensating mass also provides a highly convenient means for attaching corrective weights for accurately balancing the assembled coil.

In a particularly advantageous embodiment of this invention the pointer element is incorporated in a unit which also includes a mounting ring. A radial arm connects a central fastening boss to the opposite side of the mounting ring from which the pointer extends outwardly. This advantageously permits the pointer to be deflected a considerable distance from its plane of rotation by forces applied to it, such as in being scanned for automatic exposure control without applying undue stresses to the coil assembly.

The ends of the armature and the bearing flanges may be substantially circular in form to facilitate their manufacture, assembly and the tooling required to make them.

In accordance with a further aspect of this invention a short-circuiting yoke is inserted or molded within the coil frame to simply provide magnetic damping. This short-circuiting yoke is preferably made of aluminum to provide effective damping with the addition of very little weight to the coil assembly.

In accordance with another aspect of this invention it is advantageous to make the bearing flanges, the pointer assembly including the mounting ring, and the short-circuiting yoke from stamped metal parts.

In accordance with still another aspect of this invention the galvanometer includes an armature of the aforementioned type rotatably mounted between the outer arms of a supporting bracket from which a magnetic core supported upon an intermediate third arm extends within the inside of the coil assembly. Spiral or torsion coil springs react between the coil assembly and adjustable spring retainers, which are adjustably mounted upon the outer arms. The assembled coil and bracket are enclosed within a cylindrical cylinder within which permanent field magnets of arcuate form preferably made of ferrite material are secured preferably by glueing. In addition, the structure of the assembly is simplified by utilizing a single threaded hole through the intermediate arm for securing the supporting bracket within the cylinder and for securing the internal magnetic core to the intermediate arm. These features also simplify assembly of this device, particularly in mass production.

In accordance with another particularly advantageous form of this invention a pair of caps are resiliently engaged upon the ends of cylinder for enclosing the armature and supporting bracket within it. Apertures are provided in the caps for providing access to the bearings and spring supporting arms for adjusting the spring tension and bearing clearance without disassembling the galvanometer.

Novel features and advantages of the present invention will become apparent to one skilled in the art from a reading of the following description in conjunction with the accompanying drawings wherein similar reference characters refer to similar parts and in which the single figure is an exploded three-dimensional view of one embodiment of this invention.

In the single figure is shown a galvanometer of the moving coil type including a coil frame, which is adaptable for manufacture by a simple injection molding process. Thermoplastic materials of the polycarbonate type are particularly advantageous for such a frame. A coil 2 of fine copper wire is wound about frame 1 having parallel ends 3 and 4, which are substantially circular in form. However, the portion carrying coil need not be circular. Ends 3 and 4 are joined by a pair of longitudinal stringers 2a providing a hollow space or opening within frame 1. Ends 3 and 4 are disposed perpendicular to the longitudinal axis of rotation of the armature and concentric with it. A series of lugs 5 are molded to extend longitudinally from ends 3 and 4 about portions of their periphery remote from the coil wound about them for securing bearing flanges to them as described in the following.

Frame 1 is rotatably mounted by attaching two circular bearing flanges 6 and 7 to ends 3 and 4. Flanges 6 and 7 are advantageously stamped from a sheet of conductive metal, and they include cutouts 8 and 9 for minimizing their weight. In assembling the moving coil of the galvanometer, bearing flanges 6 and 7 are connected to ends 3 and 4 of armature frame 1 together with additional parts as described in the following. Flanges 6 and 7 are advantageously secured to armature frame 1 by deforming lugs 5 over them, for example by heating and deforming them.

Bent strips 10 and 11 are provided upon bearing flanges 6 and 7 for connection to one end of coil torsion of spiral springs 12 and 13. Pivot point 14 is secured to bearing flange 7, for example by riveting it to it. Pivot element 15 is also riveted to bearing flange 6, and it also secures mounting ring 16, to which is attached pointer 19, to end 3 of frame 1. Pointer mounting ring 16 is secured to frame 1 through a central mounting boss 17 including a hole 18 through which the riveted projection of pivot 15 extends. Mounting boss 17 is supported from mounting ring 16 by a single radial arm extending within it at a position opposite to the position of connection of pointer 19. This provides a highly flexible resilient connection between pointer 19 and the coil assembly which allows pointer 19 to be deflected a considerable distance from its plane of rotation without unduly stressing the coil assembly or the bearings in which it is mounted. This insulates them from stresses applied to a pointer which is abruptly scanned or arrested in an automatic exposure control system.

The entire pointer and mounting assembly may be conveniently manufactured as a stamped metal part; and as previously mentioned, its resilient structure prevents transmission of stresses from the pointer to the armature coil and bearing. An indentation 20 is mounting boss 17 partially engages bent strip 10 upon bearing flange 6 for precisely orienting the pointer relative to the bearing flange and coil assembly. Bearing flange 6 also includes a semi-circular mass extending in a direction opposite to that of pointer 19 when it is assembled to it to provide a compensating mass for balancing the weight of the pointer. Semi-circular extension 21 is conveniently stamped in one piece with bearing flange 6.

A short-circulating yoke 47, stamped for a single piece of metal preferably aluminum, is inserted or molded within the opening in frame 1 between ends 3 and 4 and longitudinal stringers 2a. A wound short-circuiting ring may also be provided instead of yoke 47, however this slightly increases manufacturing and assembling costs.

The assembled coil is rotatably mounted within a supporting bracket 22 including outer arms 23 and 25 and an intermediate arm 24. Pivots 14 and 15 of the coil assembly are rotatably engaged within adjustable bearing screws 26 and 27 which are mounted upon outer arms 23 and 25. A magnetic core 28 is supported at the end of intermediate arm 24, and it is thereby inserted within the center of frame 1. Magnetic core 28 is secured to arm 24 by a screw 29 inserted within threaded hole 30 longitudinally extending through arm 24, as indicated by the broken centerline. Bearing screws 26 and 27 are mounted within bearing tubes 31 secured to arms 23 and 25. A pair of spring adjusting arms 32 and 33 are rotatably mounted about bearing tubes 31 upon arms 23 and 25 respectively.

These adjustable spring supporting arms 32 and 33 include bent spring retaining strips 34 and 35 for connection respectively to one end of recoil springs 12 and 13. Arms 32 and 33 are respectively angularly secured to outer arms 23 and 25 by fastening screws 37 extending through arcuate slots 36. The angular adjustment of spring retaining arms 32 and 33 about tubes 31 on arms 23 and 25 adjusts the tension of coil springs 12 and 13. When supporting frame 22 is made of a conductive material, insulating plate 48 is inserted between spring supporting arm 33 and arm 25.

The assembly of bracket 22 and the moving coil is inserted within a short-circuited enclosing cylinder 38. This assembly is conveniently secured within the cylinder by insertion of connecting screw 40 through hole 39 of the cylinder and into threaded hole 30 in intermediate arm 24. This locates the bearings on arms 23 and 24 of bracket 22 and the rotatable coil assembly that they support along the longitudinal axis between arcuate magnets 41 and 42 secured to cylinder 38. Magnets 41 and 42 are advantageously made of sintered magnetic materials of the ferrite type. These magnets are conveniently secured within the cylinder by glueing them inside of it before the bracket and coil assembly is inserted within it. This assembling operation accordingly automatically locates the coil along the longitudinal axis of cylinder.

A pair of caps 43 enclose the ends of short-circuiting cylinder 28. These caps 43 are conveniently made of a resilient plastic having skirts 44 which resiliently engage the outer surface of the cylinder 38. Caps 43, which are preferably made of a transparent plastic, also include arcuate slots 45 and holes 46 to provide convenient access to screws 26 and 37 after the galvanometer is assembled. The clearance in the bearings and tension of recoil springs 12 and 13 can therefore be adjusted through these apertures without the necessity to disassemble the galvanometer.

What is claimed is:

1. A coil assembly for a moving coil type of galvanometer comprising a molded plastic frame having a longitudinal axis and a pair of flat circular ends connected by longitudinal stringers, a plurality of integral plastic lugs on the periphery of the circular ends of said frame projecting away from said ends, said lugs including two pairs of spaced lugs, a coil wound longitudinally about said frame between the pairs of spaced lugs, a flat circular bearing flange mounted on each of said ends between said lugs with said coil being between each of said ends and its flange, said lugs being bent over the flanges to hold said flanges in place, pivot points secured to each of said flanges located on said longitudinal axis and extending outwardly from said flanges, a pointer unit secured to one of said flanges, and said unit including a circular mounting ring adapted to fit within said lugs mounted against its flange and a pointer extending radially from said mounting ring.

2. A coil assembly as set forth in claim 1 wherein said one of said flanges includes a compensating mass positioned opposite from the direction of extension of said pointer for balancing the weight of said pointer, and said compensating mass being made in the form of an arcuate extension of the side of said one of said flanges opposite from the direction of extension of said pointer.

3. A coil assembly as set forth in claim 2 wherein said mounting ring includes a radial arm securing a circular boss within it for securing said pointer to said one of said bearing flanges, and said radial arm being angularly aligned with the direction of extension of said pointer.

4. A galvanometer of the moving coil type comprising a coil assembly as set forth in claim 1, a support bracket having a pair of outer arms and an intermediate arm, bearing elements upon and extending longitudinally inwardly from said outer arms, said coil assembly being rotatably mounted between said outer arms with said pivot points inserted within said bearing elements, a magnetic core mounted upon said intermediate arm, a space being within said frame bordered by said ends and said stringers, said intermediate arm extending within said space and disposing said magnetic core within said assembly, adjustable spring supporting arms being movably mounted upon the outside of said outer arms, a pair of coil springs, one end of each of said coil springs being connected to one of said adjustable spring supporting arms, the other end of each of said coil springs being connected to opposite ends of said coil assembly, disengageable securing means fastening said adjustable spring supporting arms to their respective outer arms to permit the tension of said coil springs to be adjusted, a cylindrical enclosure, said coil assembly and bracket being housed within said cylindrical enclosure, and field magnets of arcuate shape being secured to said cylindrical enclosure and disposed adjacent said coil assembly parallel to said longitudinal axis.

5. A galvanometer as set forth in claim 4 wherein a threaded hole is provided through said intermediate arm, a connecting screw fastening said cylindrical enclosure to one end of said threaded hole, and a securing screw connecting said magnetic core to the other end of said threaded hole.

6. A galvanometer as set forth in claim 4 wherein a pair of plastic caps including end surfaces and skirts are secured to the ends of said cylindrical enclosure for enclosing said assembly, and said skirts of said caps resiliently engaging the outer surfaces of said cylindrical enclosure.

7. A galvanometer as set forth in claim 6 wherein portions of said end surfaces of said caps are cut away to provide apertures in line with the securing means for said adjustable spring supporting arms and said bearing elements to permit them to be adjusted without disassembling said galvanometer.

8. A galvanometer as set forth in claim 7 wherein said cut away portions are arcuate and off center, and each of said end surfaces having a central aperture for additional access to said bearing elements.

References Cited by the Examiner

UNITED STATES PATENTS

| | | | |
|---|---|---|---|
| 446,489 | 2/1891 | Weston | 324—151 |
| 698,647 | 4/1902 | Duncan | 324—151 |
| 2,810,887 | 10/1957 | Ecklund | 336—198 X |
| 2,837,716 | 6/1958 | Wolferz | 324—151 |

FOREIGN PATENTS

| | | |
|---|---|---|
| 415,443 | 8/1934 | Great Britain. |
| 597,243 | 1/1948 | Great Britain. |
| 374,960 | 9/1939 | Italy. |

WALTER L. CARLSON, *Primary Examiner.*

R. V. ROLINEC, *Assistant Examiner.*